O. F. CONKLIN.
REGULATING DEVICE FOR DYNAMO ELECTRIC MACHINES.
APPLICATION FILED JULY 10, 1917.
1,401,049.
Patented Dec. 20, 1921.
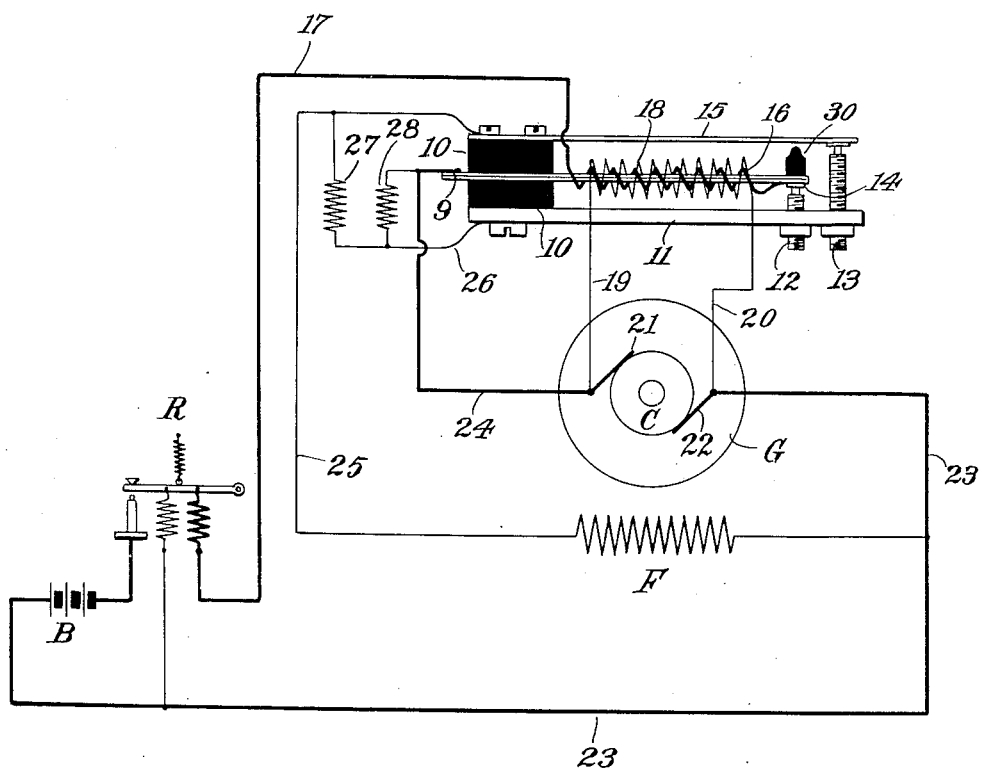

UNITED STATES PATENT OFFICE.

OLIVER F. CONKLIN, OF DETROIT, MICHIGAN, ASSIGNOR TO REMY ELECTRIC COMPANY, OF ANDERSON, INDIANA, A CORPORATION OF INDIANA.

REGULATING DEVICE FOR DYNAMO-ELECTRIC MACHINES.

1,401,049.  Specification of Letters Patent.  Patented Dec. 20, 1921.

Application filed July 10, 1917. Serial No. 179,642.

*To all whom it may concern:*

Be it known that I, OLIVER F. CONKLIN, a citizen of the United States, residing at Detroit, in the county of Wayne and State of Michigan, have invented certain new and useful Improvements in Regulating Devices for Dynamo-Electric Machines, of which the following is a full, clear, and exact description.

This invention relates to regulating devices for dynamo electric machines and is particularly adaptable for regulating the current out-put of such machines as are driven at variable speeds and used for charging storage batteries. In storage battery work it is desirable to avoid excessive charging rates which might damage the battery plates. Also, in automobile work it is desirable that the charge of the battery be started at low rotation speeds of the dynamo. In automobile applications, it is also desirable to maintain a different charging rate in the winter than in the summer. The current demand is heavier in the winter than in the summer, and for this reason it is desirable to increase the charging rate during the winter season.

In my Patent No. 1,352,051, issued September 7, 1920, I have provided a bimetallic thermostat device in heat receiving relation with the commutator, which is adapted to insert additional resistance in the field circuit when the commutator and the bimetallic thermostatic element attained a predetermined degree of heat. In this prior application the thermostatic regulator was combined with a third brush system of regulation. In the present invention I dispense with the use of the third brush system. I also associate with the thermostatic device a heating coil, which coil is in series with the dynamo electric machine and the battery, whereby the degree of heat imparted to the thermostatic device will be dependent upon the quantity of current flowing to the battery. I also contemplate the use of a voltage coil in coöperative association with a thermostatic controller, whereby the controller will operate to protect the generator upon a certain voltage being attained in the mains leading from the generator.

Further objects and advantages of my present invention will be set forth in detail in the accompanying specification.

In the drawings the figure illustrates diagrammatically my improved regulating apparatus.

In further detail in the drawings G is the generator having commutator C. F is the field, here shown as a shunt field but which may be differential or compound, if desired, and B is the battery. R is the usual reverse current relay which prevents the current from the battery flowing back to the generator when the generator is stationary or rotating at very low speeds.

The regulating device comprises a bimetallic member 9, carried between insulating blocks 10. This bimetallic member 9 may be disposed in heat receiving relation with the machine or with the commutator if desired. However, this is not essential in the present embodiment, although I preferably place this regulating device in a small box or casing on the top of the generator. The casing is apertured to permit the ingress of air. Fastened to the lower insulating block is a conducting supporting member 11, carrying a short contact 12 and a long contact 13. These contacts are preferably made so that they may be adjusted with respect to member 11. The thermostatic element 9 carries on its end a contact 14 which normally makes an electrical connection with contact button 12. Secured to the upper insulating block 10 is a conducting blade 15, carrying a button on its end which makes an electrical contact with contact 13, carried by support 11.

By adjusting contacts 12 and 13 with respect to the member 11, the pressure between the movable contact 14 and contact button 12, and between contact 13 and the end of blade 15 can be respectively adjusted. In this manner the temperatures may be varied at which these pairs of contacts will be separated.

Connected to the bi-metallic thermostatic element, adjacent the end to which button 14 is attached, is a series heating coil 16. This coil, it will be understood, is insulated from the thermostatic element. Any suitable insulation may be provided if desired. If desired, the wire may be embedded in an enamel insulation to serve the double purpose of preventing the leakage of current and the access of air to the wire which might cause oxidation and burning out. The other end of the series coil 16 leads through wire 17 to the cut-out R and therethrough to the battery B. Also surrounding the bimetallic thermostatic element 9 is a voltage coil 18. This coil comprises many turns of fine wire and is also embedded in a suitable heat resisting insulation. The opposite ends of this voltage coil lead through wires 19 and 20 to the brushes 21 and 22 respectively. From brush 22 a heavy main lead wire 23 leads to the opposite side of the battery. From brush 21 a similar heavy wire 24 leads to the end of the thermostatic element which projects through the insulating block 10.

The shunt field F connects at one end to the wire 23 and at its opposite end connects through wire 25 to the conducting blade 15. Leading from the conducting blade 11 is a wire 26 which, at its end, connects with resistance 27, and the opposite end of this resistance connects with wire 25 leading to the field. Also connected with wire 26 is a second resistance 28 which, at its upper end, has a connection with the bimetallic thermostatic element.

The method in which the above described parts operate to effect the regulation will now be described. When the generator G starts to rotate current will flow from the commutator C through brush 21, wire 24, bimetallic thermostatic element 9, series heating coil 16, wire 17, through the relay R, as soon as it closes, to battery B and back through wire 23 and brush 22 to the commutator. The field current will flow in the following circuit: from brush 21 through wire 24, bimetallic thermostatic element 9, contact 14, contact 12, support 11, contact 13, blade 15, wire 25, through field F and back through wire 23 and brush 22 to the commutator. With the connections as above traced the machine will operate as a straight shunt wound generator and a considerable current output will result, due to the field F being quite strong. This gives a high initial charging rate to the battery.

As the curent flowing to the battery increases, a heating effect will be set up in heating coil 16. This coil will eventually heat the bimetallic thermostatic element 9 to such an extent that it will bow upward in a counterclockwise direction and open contacts 12 and 14. It will be understood that this heating effect is a function of the current flowing through the series heating coil 16 and by properly proportioning the turns and resistance of this coil the thermostat will be caused to open upon the attainment of a predetermined current flow in the series coil and load circuit or leads. When contacts 14 and 12 are open, the field current will flow in the following path: from brush 21, wire 24, through resistance 28, wire 26, support 11, contact 13, blade 15, wire 25, field F and back through wire 23 and brush 22 to the commutator. The effect of inserting resistance 28 in series with the field is to cut down the output of the generator and this decreased output will cool off the coil 16 and possibly again close the contacts 14 and 12. The current will then again build up and the cycle of operation will then be repeated.

It is possible, however, that after the contacts 14 and 12 have opened that the speed of the generator G will still increase to such an extent that the current flowing to the battery will be above the desired amount. I accordingly provide means for inserting more resistance in series with the field. Carried by the bimetallic thermostatic member 9 is an insulating block 30. As the thermostatic element bows upwardly and after the contacts 12 and 14 have opened, this insulating block will eventually come in contact with blade 15 and bow this blade upwardly breaking the contact between the blade 15 and the long contact 14. When this occurs, the field current will flow in the following circuit: from brush 21 through wire 24, resistance 28, secondary resistance 27, wire 25, field F back through wire 23 and brush 22 to the commutator. With this condition there will be two resistances, $i.\ e.$ 27 and 28 in series in the field circuit. These resistances will so cut down the field excitation that the current output will be reduced to a safe amount regardless of the generator speed. While I have shown in the present embodiment only two such resistances, it will be understood that I do not limit myself to this particular number. Any number of these resistances can be employed being thrown into the field in the manner above described.

With shunt wound generators of this type, particularly when used on automobiles, it is desirable to provide some means for regulating the rise of voltage in the machine should the battery become detached. This voltage regulation is also of advantage during normal running operations with the battery in circuit, but it is particularly so when the battery is removed. Under these conditions the voltage of the machine tends to build up to an excessive amount which would damage the generator windings and any incandescent lamps connected in the circuit. To prevent this excessively high voltage I provide voltage coil 18. This operates in a similar manner to the series coil 16 previously described. An excessive voltage at brushes 21 and 22 will cause more current to flow through voltage coil 18, which current will cause local heating to a sufficient extent to affect the thermostat and effect the field regulation previously described.

It is apparent that the generator will be protected no matter where interruption of the battery charging circuit may occur. If the interruption should occur in wire 17, coil 16, or in wire 23 between the battery B and the connection with field F, then the voltage across the brushes 21 and 22 would tend to increase to a point where the armature and field windings would be damaged. The voltage heating coil 18 prevents this by heating up the blade 14 to a point where the field excitation is reduced. If the interruption in the charging circuit should occur in wire 24 or in wire 23 between brush 22 and the connection with field F, obviously, field excitation would be interrupted and the voltage would be reduced.

It will be understood that I do not limit myself to the combination of a current and voltage coil as the voltage coil may be used alone. Furthermore, the present invention does not contemplate the heating up of the bimetallic thermostatic element by the passage of the current therethrough. This feature I do not claim as my invention.

It will be understood that the invention is susceptible to various modifications and changes as will occur to those skilled in the art.

What I claim as my invention is more particularly pointed out in the appended claims:

1. A thermostatic regulating device including a plurality of resistances adapted to be cut into or to be short-circuited from a circuit to be controlled, a plurality of blades for normally short-circuiting said resistances, one of said blades being a bimetallic thermostatic element, and means for heating the thermostat element to bend the same to open a short-circuit, another blade being positively actuated by said thermostatic blade to open another short circuit.

2. A thermostatic regulating device including a plurality of regulating circuits each adapted to be brought into effective relation with a circuit to be controlled, a plurality of pairs of solid metal contacts for respectively controlling said circuits, one contact of each pair being movable and the other contact being stationary, and a thermostatic element for successively moving said movable contacts into or out of engagement with the stationary contacts.

3. A thermostatic regulating device, including a plurality of regulating circuits each adapted to be cut into or short-circuited from a circuit to be controlled, a plurality of pairs of solid metal contacts for respectively controlling said circuits, one contact of each pair being movable and the other contact being stationary, and a thermostatic element for successively and positively moving said movable contacts out of engagement with the stationary contacts, said thermostatic element carrying one of said movable contacts.

4. A thermostatic regulating device including a conducting support, a plurality of stationary contacts mounted on said support, a plurality of flexible blades mounted on said support but insulated therefrom and from each other, one of said blades being a bimetallic thermostat, movable contacts carried by said blades and coöperating respectively with the stationary contacts, resistances connected respectively in shunt with the pairs of movable and stationary contacts, and means for imparting motion from the bimetallic blade to the other blade.

5. A thermostatic regulating device including a conducting support, a plurality of stationary contacts mounted on said support, a plurality of flexible blades mounted on said support but insulated therefrom and from each other, one of said blades being a bimetallic thermostat, said thermostat being located nearest to the supoprt and all blades bendable away from the support, movable contacts carried by said blades and coöperating respectively with the stationary contacts, resistances connected respectively in shunt with the pairs of movable and stationary contacts, and a non-conducting block carried by said thermostat blade for imparting movement to said other blade.

6. A thermostatic regulating device including a plurality of regulating circuits each adapted to be brought into effective relation with a circuit to be controlled, a plurality of pairs of solid metal contacts for respectively controlling said circuits and thermostatic means for positively and successively separating said pairs of contacts.

7. A thermostatic regulating device including a plurality of regulating circuits each adapted to be brought into effective relation with a circuit to be controlled, a plurality of pairs of solid metal contacts for respectively controlling said circuits, thermostatic means for positively and successively separating said pairs of contacts, and means for adjusting the pressure between each pair of contacts to vary the temperatures at which the pairs of contacts are separated.

In testimony whereof I affix my signature.

OLIVER F. CONKLIN.